United States Patent [19]

Johnston et al.

[11] 3,837,067

[45] Sept. 24, 1974

[54] METHOD OF MAKING INTEGRATED CIRCUIT PACKAGE

[75] Inventors: Samuel A. Johnston, Fontana; John G. Lyons, Jamesville; Henry J. Riedmayer, Fort Atkinson, all of Wis.

[73] Assignee: The Bunker-Ramo Corporation, Oak Brook, Ill.

[22] Filed: Feb. 20, 1973

[21] Appl. No.: 333,562

Related U.S. Application Data

[62] Division of Ser. No. 211,655, Dec. 23, 1971, Pat. No. 3,784,948.

[52] U.S. Cl. ........................ 29/613, 29/592, 29/619, 29/625, 29/628, 339/17 E, 339/196 M

[51] Int. Cl. .......................... H01c 1/02, H01c 11/00

[58] Field of Search ............. 29/592, 613, 619, 624, 29/625, 628, 610, 627; 338/183, 194, 307, 313, 320; 339/218 M, 218 R, 196 M, 17 E, 17 B

[56] References Cited

UNITED STATES PATENTS

| | | | |
|---|---|---|---|
| 3,381,372 | 5/1968 | Capano | 29/627 |
| 3,502,786 | 3/1970 | Stoll | 29/627 |
| 3,551,872 | 12/1970 | Emmott et al. | 338/183 X |
| 3,564,476 | 2/1971 | Barden | 338/128 X |
| 3,585,563 | 6/1971 | Hegle | 338/183 X |

*Primary Examiner*—Charles W. Lanham
*Assistant Examiner*—Victor A. DiPalma
*Attorney, Agent, or Firm*—D. R. Bair; F. M. Arbuckle

[57] ABSTRACT

An integrated circuit-type package including a ceramic substrate having conductive and resistive paths, including both variable and fixed resistances, a pair of terminal strips each having a plurality of terminal elements being secured to the substrate on opposite sides thereof by clinching and soldering in electrical engagement with respective ones of the paths and forming a unitary, rigid and mechanically strong assembly with in-line pin elements. Flat bonding elements are applied to opposite surfaces of the substrate enclosing the clinching elements. A case having a hollow interior containing a lead screw and a contact carrier is adhered to the substrate by the application of heat and pressure, which also cause the bonding members to flow around and embed the clinching elements.

7 Claims, 18 Drawing Figures

PATENTED SEP 24 1974

3,837,067

METHOD OF MAKING INTEGRATED CIRCUIT PACKAGE

This is a division, of application Ser. No. 211,655, filed Dec. 23, 1971, now U.S. Pat. No. 3,784,948.

OBJECTS OF THE INVENTION

The present invention resides in the general field of integrated circuits and more particularly of the type including variable resistances, or potentiometers. Previously in integrated circuit-type devices a variable resistance device would be utilized in connection with a number of other separate components, such as in fixed circuit means. The provision of variable resistance elements, or potentiometer, in conjunction with various fixed resistances for use together, as in a mounting card or board resulted in a complex arrangement. Each of the different components, including both the variable resistance, and the fixed resistances, were made under different circumstances, such as at different times or under different manufacturing control, so that the potentiometer did not always provide the desired compensating effect required in connection with the fixed resistances.

A broad object of the invention therefore is to provide a circuit device having a novel arrangement of both variable and fixed resistances.

Another and broad object is to provide a novel integrated circuit package which performs all the functions mormally associated with potentiometers, by the inclusion of variable resistance therein, and which additionally includes fixed resistances which are connected in circuit in the same operation of placing the potentiometer resistances in circuit.

Still another broad object of the invention is to provide an integrated circuit-type component or package which lends itself to single automatic board insertion, in contrast to previously known arrangements involving individual insertion of various discrete components which would include both variable resistances and fixed resistances for incorporation in other circuits.

A further object is to provide an integrated circuit-type component having resistances of plural character, such as variable resistances and fixed resistances in the production and use of which the temperature coefficient of all of the resistances and all other electrical performance parameters are substantially identical as between both the variable and the fixed resistances.

Still another object is to provide a device of the foregoing general character in the production of which the processing technique as to all the resistances are identical and therefore an economic advantage in manufacturing costs is achieved, this in contrast to previously known arrangements incorporating a plurality of discrete components which are manufactured separately and individually put into position in the final assembly.

Still another object is to provide a novel integrated circuit-type device which is compatible with presently known devices, and which can therefore be used therewith without modification of the other devices, or special adaptation.

A still further and more specific object is to provide an integrated circuit-type component of the foregoing character which includes both variable and fixed resistances deposited on a single substrate.

An additional object is to provide an integrated circuit-type device of the foregoing character which is compact and rigid, and which has a main body or portion made up of parts cemented or fused together forming a unified device, and which includes only a lead screw and contact unit that are movable, and the lead screw and contact unit are enclosed within the remainder of the device except for an end surface of the lead screw which is exposed to the exterior for access for manual manipulation, but which can be disposed within the confines of the remainder of the deivce.

Yet another object is to provide a device of the foregoing character which is of extremely simple constructuion, but which lends itself to accurate dimensioning of the parts whereby to provide accurate and consistent electrical characteristics.

An additional object is to provide an integrated circuit-type device of the foregoing character including a novel construction of mounting the terminal contact elements on the substrate in clinching engagement therewith, forming both great mechanical strength and good electrical engagement.

Still another object is to provide a novel method of making an integrated circuit-type component of the foregoing character.

A further and more specific object is to provide a method of making an integrated circuit-type component which includes a novel method of mechanically interconnecting, and bonding the physical elements together.

DESCRIPTION OF A PREFERRED EMBODIMENT

Figure 1:
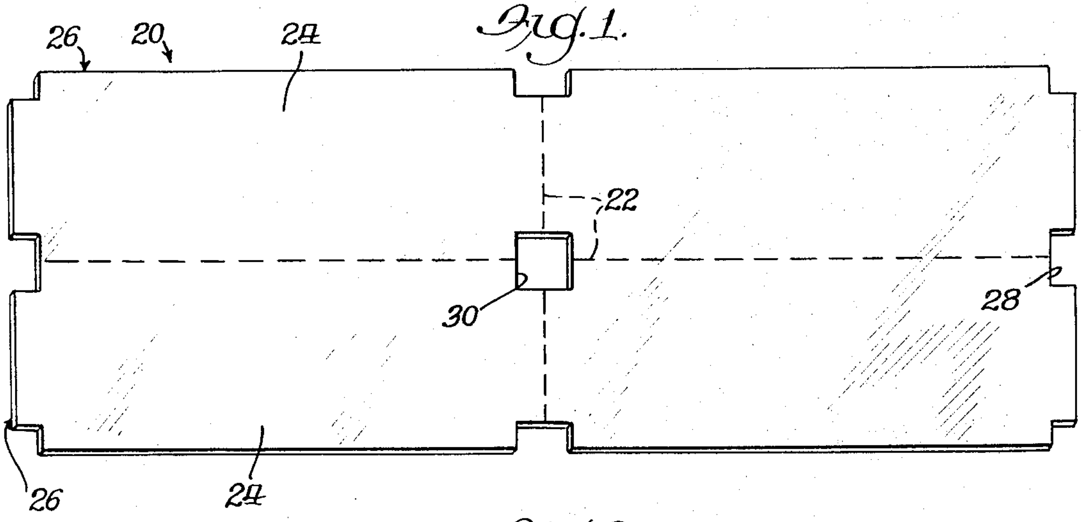
FIG. 1 is a face view of a blank for forming the substrates, the blank shown to be divided into four substrates.

Referring in detail to the accompanying drawings, attention is directed first to FIG. 1 showing a blank or sheet 20 from which the substrates are made, being of ceramic material of known kind, such as alumina. The blank 20 is scored at lines 22 whereby it can be easily broken or separated to form a plurality of substrates, in the present instance four, and preferably after the conductive and resistive pattern is applied thereto, the pattern when thus applied to the blank being repeated in each of the areas 24 defined by the score lines. After the blank is separated it forms the individual substrates referred to, now identified at 26. The blank is provided with notches 28 and a central hole 30 to provide corresponding notches 32 in the individual substrates, there being thus one such notch 32 at each corner of the substrate.

Figure 2:
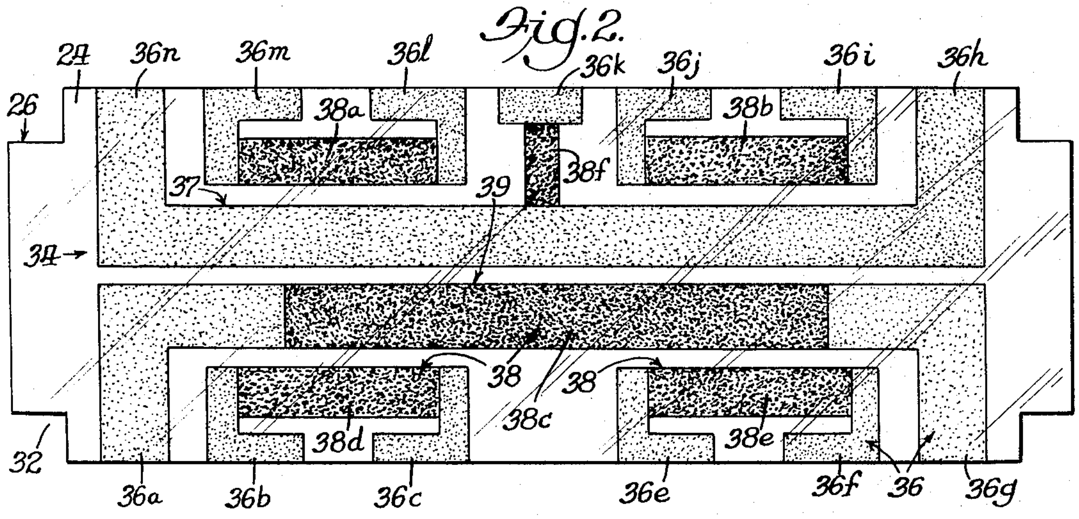
FIG. 2 is a face view of a substrate with the conductive and resistive pattern thereon.

The conductive and resistive pattern indicated in its entirety at 34 is applied to one of the areas 24, or substrate 26, is shown in its entirety in FIG. 2. This pattern is applied in any known manner such by as a screening process or a film evaporation process, and in the present instance includes conductive paths 36 and resistive paths 38. The conductive paths have terminal elements leading to the side edges of the substrate, thus forming a dual in-line arrangement of those terminal elements and of the contact elements applied thereto as referred to hereinbelow. The terminal elements of the conductive paths are individually identified by the reference numeral 36 with subscripts *a*, *b*, *c*, etc., and the resistive paths 38 are individually identified by that reference numeral with the subscripts *a*, *b*, *c*, etc., in order to correlate them with the circuit diagram of FIG. 3. That circuit diagram is of well known character and commonly and universally used in integrated circuit (I.C.) type arrangements, being applicable to many requirements such as voltage biasing operational amplifiers, current biasing operational amplifiers, and general purpose voltage dividers. The terminals of the conductive paths as well as the resistive paths of the pattern of FIG. 2 are all identified in FIG. 3. The strips include a pair of central parallel paths 37, 39, the first being made up entirely of a conductive strip, and the second including the resistive segment 38*c*, these two paths being utilized in the variable resistance, or potentiometer, phase of the device.

In the operation of applying the conductive and resistive paths, the pastes, or inks as they are also known, are applied in a manner referred to, to the blank 20 and the blank fired for curing the pastes. First the conductive paste is applied and the substrate fired at about 1000C; then the resistive paths are applied and the substrate again fired, but at about 850C. A number of pastes or inks may be found on the market for the purpose, examples being those put out by Electro-Science Laboratories Inc., No. 6800B for a conductive path and No. 7012 for a resistive path.

Figures 3, 4:
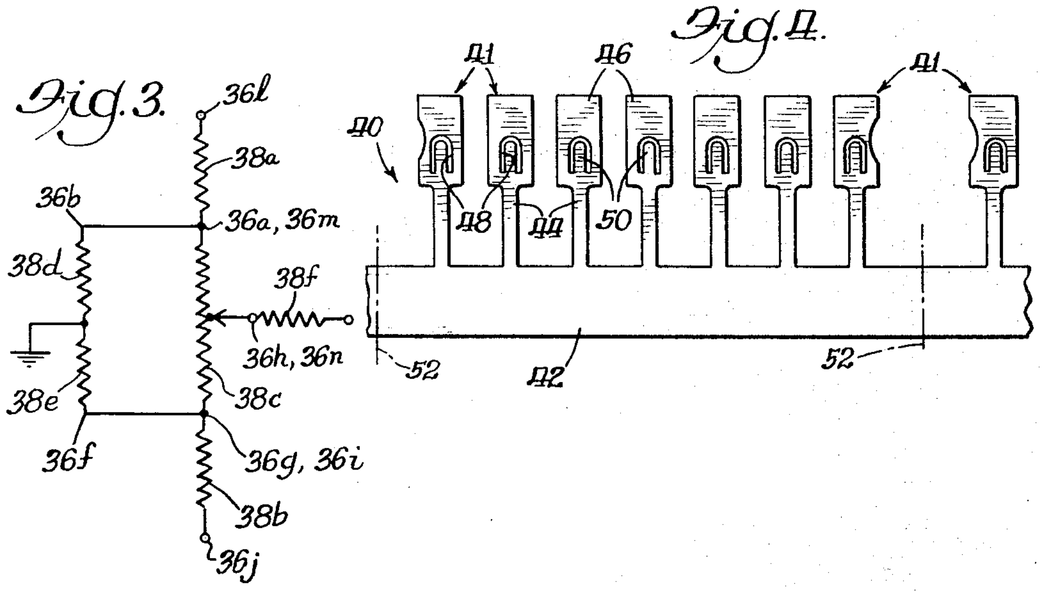
FIG. 3 is a diagram of a typical circuit to which the device of the present invention is applicable.
FIG. 4 is a face view of a lead frame, or terminal strip, two of which are connected to the substrate.
Figures 5, 6, 7, 8, 9, 10, 11, 12:
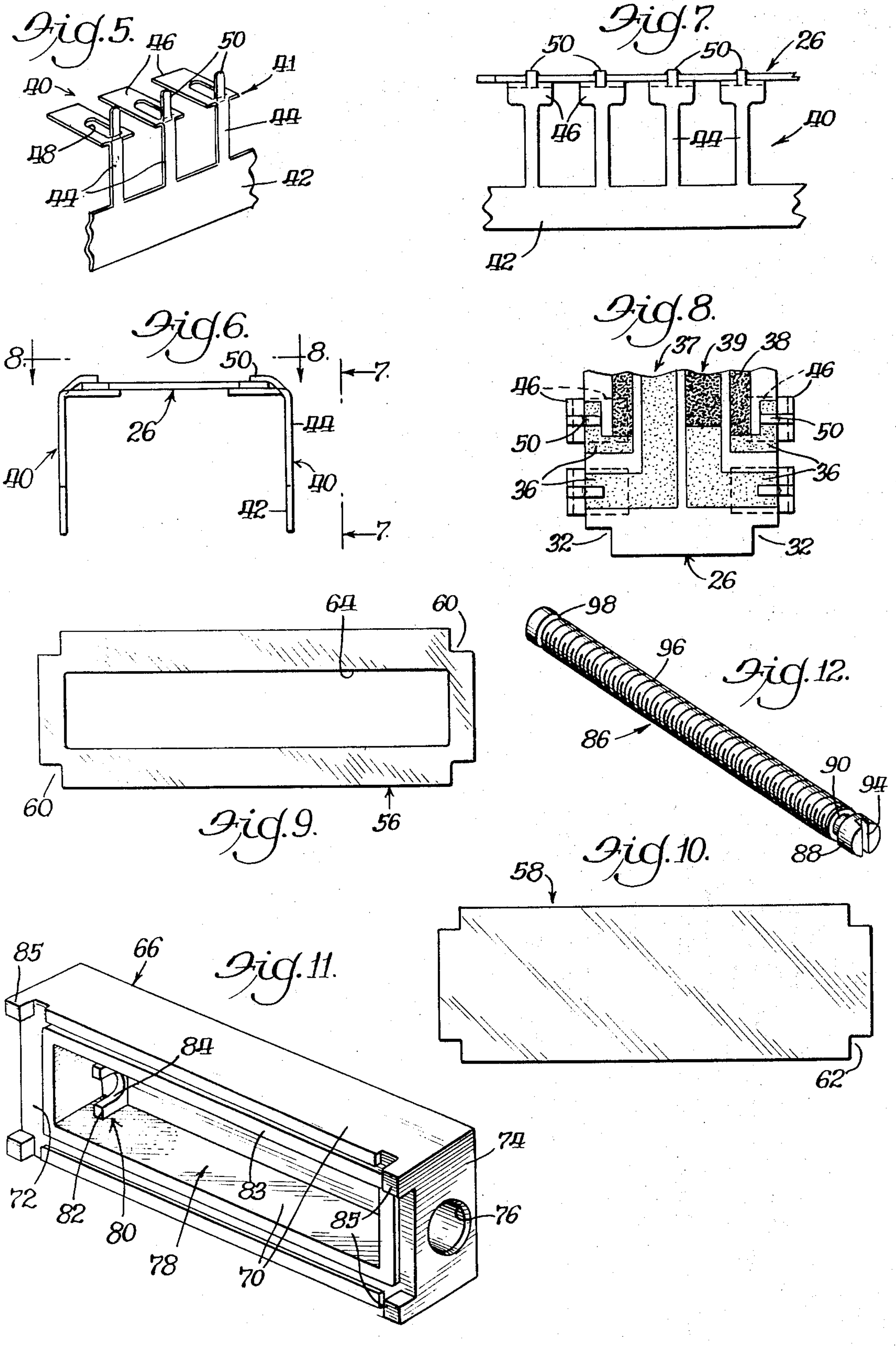
FIG. 5 shows a portion of the lead frame of FIG. 4 in perspective view, and after an initial forming operation.
FIG. 6 is an end view of the substrate and two lead frames of FIG. 5 applied thereto.
FIG. 7 is a side view of the device of FIG. 6, taken at line 7—7 thereof.
FIG. 8 is a top view of FIG. 6, taken at line 8—8 thereof.
FIG. 9 is a face view of a bonding strip.
FIG. 10 is a face view of another bonding strip.
FIG. 11 is a perspective view of the case of the device, showing the underside.
FIG. 12 is a perspective view of the lead screw.

FIGS. 4 and 5 show a metal lead frame or terminal strip 40, two of which are applied to the substrate. Each lead frame 40 preferably is a segment of a relative long strip from which are made a number of short strips for individual substrates. A blank is first utilized and stamped to form the device 40 of FIG. 4 and as such includes a connecting element 42 which is later removed, from which lead a plurality of elements 41 including stems 44 forming pins or pin contacts in the final device, and wide elements or paddles 46 within which is stamped out an opening 48 forming elements 50. In further steps, the wide elements or paddles 46 are bent over into a common plane perpendicular to the plane of the stamping as a whole, as shown in FIG. 5, and the lead frames 40 are cut into individual lengths as indicated by the lines 52 of FIG. 4 and each containing a plurality of the elements 41, for example seven as here utilized. These lead frames or terminal strips 42 are applied to opposite side edges of the substrate as represented in FIGS. 6, 7, and 8. The lead frames are so applied with the substrate engaging and resting on the paddles 46 which form a shelf or ledge, and then the elements 50 are crimped or formed under pressure over the edges of the substrate, after first having applied solder to the substrate for securing the elements 50 directly thereto. Such solder, of known character, is deposited on the terminal elements of the conductive strips 36 at the side edges of the substrates, as by a screening step, in position to be engaged by the elements 50. The sub-assembly thus formed is heated to bond the elements 50 to the solder and the conductive strips, but at a substantially lesser temperature than that utilized in firing the conductive and resistive stips, such for example as in the neighborhood of 175°C to 300°C depending on the character of the solder.

FIGS. 9 and 10 show bonding members 56, 58, respectively of insulation material and of outline shape substantially congruent with the substrate, the member 56 having notches 60 and the member 58 having notches 62 in the corners. The member 56 is provided with a central aperture of a size and for a purpose to be referred to below, while the member 58 is preferably imperforate. These members, also known as bonding tapes, are of known content including a body of fibrous material and an epoxy-type adhesive, whereby they become bonded to the engaged elements upon application of pressure and heat, in a manner referred to hereinbelow in connection with the assembly of the device.

FIG. 11 shows a case 66 of suitable plastic and insulating material in the form of a box having a top element 68, sidewall elements 70, a rear wall element 72 and a front wall element 74, the latter having an aperture 76. The bottom side is open exposing an internal cavity 78 and within the cavity adjacent the rear wall 72 is a holder 80 for the lead screw to be referred to below, which consists of a pair of laterally spaced legs 82 which may be integral with the side walls and forming a downwardly opening notch 84. Surrounding the cavity is a rib 83, and at the corners, are legs 85 utilized for indexing purposes in the assembly of the device.

Mounted in the case 66 (FIG. 11) is a lead screw 86 (FIG. 12) of plastic and insulating material, having a head portion 88 in which is an annular groove 90 receiving a resilient "O" ring gasket 92, and provided with a slot or kerf 94. The main portion of the lead screw is provided with threads as indicated at 96, and at the rear or inner end is another annular groove 98 receiving the holder 80 in the final assembly of the device as referred to hereinbelow. The aperture 76 of the case is of substantially the same diameter as the lead screw.

Figures 13, 14, 15, 16, 17, 18:
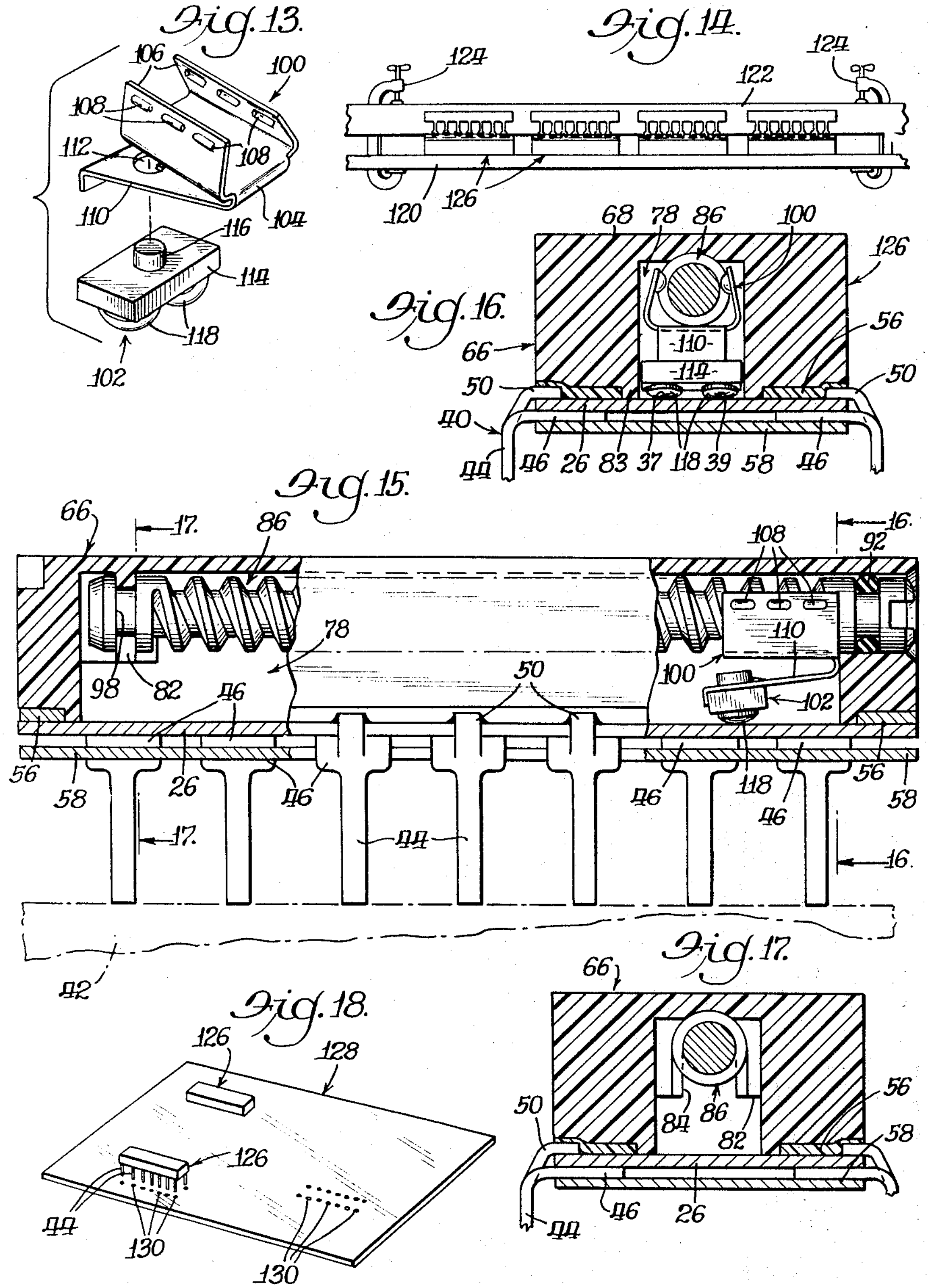
FIG. 13 is a perspective and exploded view of a contact carrier and the associated contact button.
FIG. 14 shows a group of the devices in clamping means in a step of the assembling operation.
FIG. 15 is a longitudinal vertical sectional view of the assembled device.
FIG. 16 is a sectional view taken at line 16—16 of FIG. 15.
FIG. 17 is a sectional view taken at line 17—17 of FIG. 15.
FIG. 18 is a fragmentary perspective view of a circuit card, indicating the manner in which the device of the invention is utilized therewith.

FIG. 13 shows two additional parts making up the final assembled device. Reference is made to this figure and FIGS. 15–17, showing a carrier 100 and a contact member 102, which may be of carbon, or of precious metal as may be desired in the case of thin film processes of deposition electrical paths. The carrier 100 is preferably of suitable spring metal adapted for fabricating, and includes a bottom element 104 and a pair of upwardly and inwardly directed wings 106 forming a channel shape, the wings 106 each having inwardly struck projections 108. The bottom element 104 is provided with an extension which is bent downwardly to form a resilient tongue 110 having an aperture 112 therein. The contact member 102 includes a rectangular body 114 having an upwardly extending stem 116 and a pair of transversely spaced downwardly extending contact elements 118 for engaging certain conductive and resistive paths on the substrate of the potentiometer or variable resistance portion of the device, as referred to below.

The foregoing includes a description of all of the individual parts of the device, and the step of making the subassembly of FIGS. 6, 7, 8; the final assembly is made according to the following description.

The lead screw 86 (FIG. 12), first fitted with the "O" ring 92, is inserted into the case 66 (FIG. 11) through the aperture 76, and the inner end of the lead screw is snapped into position in the holder 80. Then the carrier 100 with the contact member 102 therein is inserted through the open bottom of the case 66, and the wings 106 are snapped over the body of the lead screw, the wings yielding for this purpose. The projections 108 are positioned a sufficient distance from the bottom element 104 as to be disposed above the transverse diameter of the lead screw and thus frictionally hold the carrier on the lead screw.

As the next step in the final assembly, the case 66 with the lead screw and carrier sub-assembly therein, is turned on its back, for convenience, and then the bonding strip 56 of FIG. 9 is fitted on the case. The notches 60 in the bonding member 56 receive the legs 85 of the case and the central aperture 64 of the bonding strip receives the rib 83, leaving the cavity 78 open. Next the sub-assembly of FIGS. 6–8 including the substrate and the lead frames, is placed on the bonding member 56, with the lead frames extending upwardly. As a final step in the assembly, the bonding member 58 of FIG. 10 is put in place, covering the paddles 46 and the under surface of the substrate between those paddles.

After the parts are assembled as thus described, the assembly, and preferably a plurality of such assemblies, are clamped between a pair of clamp bars 120, 122 by suitable clamps 124. One of the clamp bars, 120, fits against the cases while the other one, 122, fits against the bonding members 58, positioned between the lead frames. Suitable pressure is then applied, such as between 15 lbs. and 50 lbs. p.s.i., and the fixture is placed in an oven of about 160°C. for between about 1½ to 2 hours. In response to the pressure and heat so applied, the bonding members 56, 58 melt and they distort and flow, and cover and embed therebetween, the elements 50 and 46 and the exposed surfaces of the substrate, above and under, between these elements. The epoxy type adhesive is rendered effective by these steps, and those members are adhered securely to the elements therebetween.

The fixture then is removed from the oven and the individual assembled devices removed from the fixture and then the connecting strip 42 is out from the stems 44, leaving the latter as individual and detached pins 44 forming contact elements for connection with cooperating contact elements.

In the assembly of the device as represented best in FIG. 15 the inner or rear end of the lead screw is retained in upper position by the biasing effect of the carrier 100, and specifically such effect as produced by the tongue 110. Upon turning the lead screw, the projections 108 follow the threads, and the carrier with the contact member is moved therealong in corresponding direction. If the lead screw should be turned accidentally beyond the point where the carrier reaches its normal endmost position, the wings 106 will spread and enable further turning of the lead screw without jamming the carrier, and upon reverse turning of the lead screw, the projection will again fall into position between the threads and follow the lead screw in the opposite direction.

The finally assembled and completed device, now identified 126, is shown in FIG. 18 in connection with an integrated circuit card 128 of known kind in which the device may be used. The card 128 is provided with apertures 130 in a standard pattern, which in the present instance includes two rows of seven each for receiving the pins 44 which are of that same number, the device being designed with that in view so as to be compatible with presently known systems. The finished device 126 may be mounted to the card by inserting the pins through the apertures 130 after which the pins are clinched, and soldered, in engagement with conductor paths on the underside of the card.

As shown best in FIGS. 15 and 17 the internal cavity 78 of the case registers only with the two inner strips 37, 39 on the substrate and the contact member 102 engages these two strips and forms a potentiometer. The remaining fixed-resistance strips are disposed laterally outwardly beyond the strips 37, 39 or potentiometer elements, and are entirely confined between the bonded elements of the device and directly between the bonding members 56, 58.

The conductive and resistive strips on the substrate are of the desired and predetermined uniformity of character: i.e., all of the conductive paths can be of the desired uniformity, as can all of the resistive paths; they are applied by the same technique and therefore are of uniform thickness, and electrical operational characteristics, such as conductance or resistance, respectively, and this points up the contrast between the uniformity of characteristics as between the various elements and components of the device relative to devices heretofore made in which the fixed resistors for example were separate and individually made and put in place. Those manufacturing techniques would not be uniform as between the variable resistors and the fixed resistors, and hence greater problems occurred in compensating for variations as between the different fixed resistors, and as between them and the variable resistors. In integrated circuits heretofore known, the various components utilized were, at least in great part, produced in batch lots, by only semi-automatic process so that there was a lack of uniformity, particularly between the variable and the fixed resistances. Additionally the steps of individually placing the variable resistors, or potentiometer, and the fixed resistors, in place required separate steps with consequent greater manufacturing costs.

The device as thus produced is not limited to a trimmer resistance circuit, but has general applicability to the general field involving variable and fixed resistance circuits. The device is a completely unified package which includes both variable and fixed resistances and is completely compatible with systems and arrangements heretofore known. The device as a complete integrated package may be inserted in the circuit card 128 by presently known automatic operations, requiring only a single step as contrasted to a plurality of steps for equivalent separate components heretofore known.

The method of attaching the lead frames to the substrate provides not only great mechanical support independent of the electrical connection, but the method of securing it eliminates the necessity for high temperatures and necessary reducing atmospheres that have been utilized heretofore with consequent great manufacturing expense. Additionally, the high temperatures and reducing atmospheres could be detrimental to the resistive elements and other elements.

All of the resistive elements are of uniform, or consistent, dimensions and mass, whereby to provide constant and dependable electrical resistance characteristics including temperature coefficient of resistance, in the operation of the device.

All of the paths being formed on a common substrate are contained in a single package which is physically compatible with in-line integrated circuits now known. All of the conductive and resistive paths or tracks terminate in the side edges of the substrate and form straight in-line arrangements, this being completely compatible with arrangements heretofore known and commonly in use.

An additional advantage of the device is that it can be used, if desired, solely as a trimming potentiometer, by utilizing only the leads connected with the variable resistance paths, by omitting all of the fixed resistance elements.

The construction enables placement of the electrical paths on any surface of the substrate, i.e., upper, under, or side edge surfaces.

A further advantage is that the device incorporates a physically strong construction for accommodating the pull force encountered in removing it from a plug-in installation.

We claim:

1. A method of making a resistance circuit package of unified structure comprising the steps of:

providing a substrate;

depositing a plurality of electrical paths on the substrate, said paths including a pair of parallel paths, one of a conductive material and one of a resistive material, said parallel paths being adapted to provide a continuously variable resistance, and at least one additional path providing a fixed resistance;

securing at least one contact element to the periphery of said substrate in electrical engagement with each of said paths, said elements being adapted for connection to external circuit means;

securing to the substrate a case having an internal cavity surrounded by an upstanding rib, by applying to said case a first bonding member having an outline shape substantially congruent with that of said substrate, and having a central aperture substantially congruent with said rib, said first bonding member being placed around said rib, applying said substrate to said first bonding member with said parallel paths on the side facing said case, said parallel paths falling within said central aperture, applying to said substrate on the side away from said case a second bonding member substantially covering said last mentioned side of said substrate, and applying heat and pressure to the composite assembly so formed, sufficient to cause said first bonding member to adhere said substrate securely to said case, and said second bonding member to be adhered securely to the side of said substrate away from said case.

2. A method according to claim 1 including the steps of mounting a lead screw in the cavity of said case with an end of said lead screw being exposed to the exterior for manual control;

and mounting a carrier on the lead screw, said carrier having a contactor means carried thereon and engaging said pair of parallel paths when said substrate is adhered to said case.

3. A method of making an integrated circuit type device comprising the steps of:

providing a substrate, depositing electrical paths thereon, applying contact elements to the substrate in engagement with the electrical paths by forming furcate portions of said elements under pressure over the edges of said substrate into frictional holding engagement therewith, applying to the peripheral portions of the side of said substrate having the electrical paths thereon a first bonding member having a central aperture, applying to the opposite side of said substrate a second bonding member substantially covering that entire side of said substrate, and applying pressure and heat to said bonding members sufficient to cause them to adhere to said substrate, and to cover and embed between said bonding members and said substrate the portions of said contact elements extending inwardly from the edges of said substrate.

4. A method in accordance with claim 3, including the additional step of applying to the first bonding member a case including contactor means engageable with electrical paths exposed through said aperture, the step of applying pressure and heat additionally adhering said case to said substrate.

5. A method according to claim 3 and including the additional step of applying the contact elements in the form of groups, each group having a continuous strip interconnecting the contact elements, and thereafter removing the strip to form separate and mutually detached contact terminations.

6. A method according to claim 3 wherein said contact element applying step includes the steps of resting the substrate on a shelf formed by flat paddle elements of each contact element, said paddle elements each being bent at an angle perpendicular to the contact element, and forming a second narrow element of each contact element over the edge of the substrate.

7. A method according to claim 6 wherein said contact element applying step includes the step of applying solder to the areas of said path to which the narrow elements are formed, permanently securing the contact members to the substrate.

* * * * *